United States Patent

[11] 3,612,575

| [72] | Inventor | Jack B. Stewart |
| | | 10441 E. Bisby St., El Monte, Calif. 91731 |
| [21] | Appl. No. | 3,294 |
| [22] | Filed | Jan. 16, 1970 |
| [45] | Patented | Oct. 12, 1971 |

[54] TRAILER BACKING GUIDE
8 Claims, 5 Drawing Figs.

[52] U.S. Cl. ................................................ 280/474, 280/408, 280/482
[51] Int. Cl. ........................................................ B62d 53/00
[50] Field of Search ............................................ 280/474, 456, 482, 446 B, 408

[56] References Cited
UNITED STATES PATENTS

| 2,910,816 | 11/1959 | McCarty ....................... | 280/456 X |
| 3,033,593 | 5/1962 | Zaha ............................. | 280/474 X |
| 3,157,416 | 11/1964 | Sandbakken .................. | 280/482 UX |
| 3,322,440 | 5/1967 | Breithaupt .................... | 280/474 X |
| 3,421,777 | 1/1969 | Barker et al. ................ | 280/423 A X |
| 3,502,351 | 3/1970 | Gray ............................ | 280/446 B |

FOREIGN PATENTS

| 1,478,852 | 4/1967 | France ......................... | 280/474 |

Primary Examiner—Leo Friaglia
Attorney—White & Haefliger

ABSTRACT: A backing guide for a trailer includes multiple brackets connectable to pulled and pulling units and an elongated guide bar releasably connectable with the brackets, the bar being lengthwise adjustable.

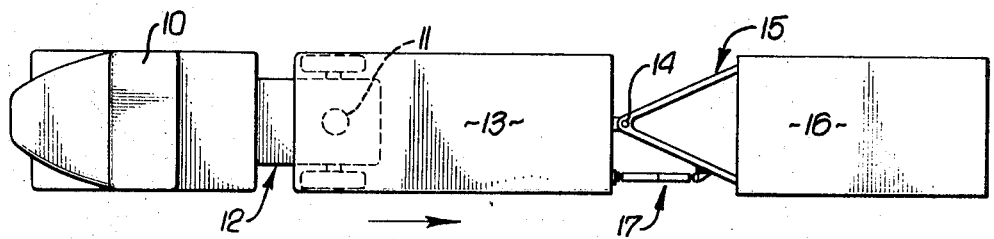
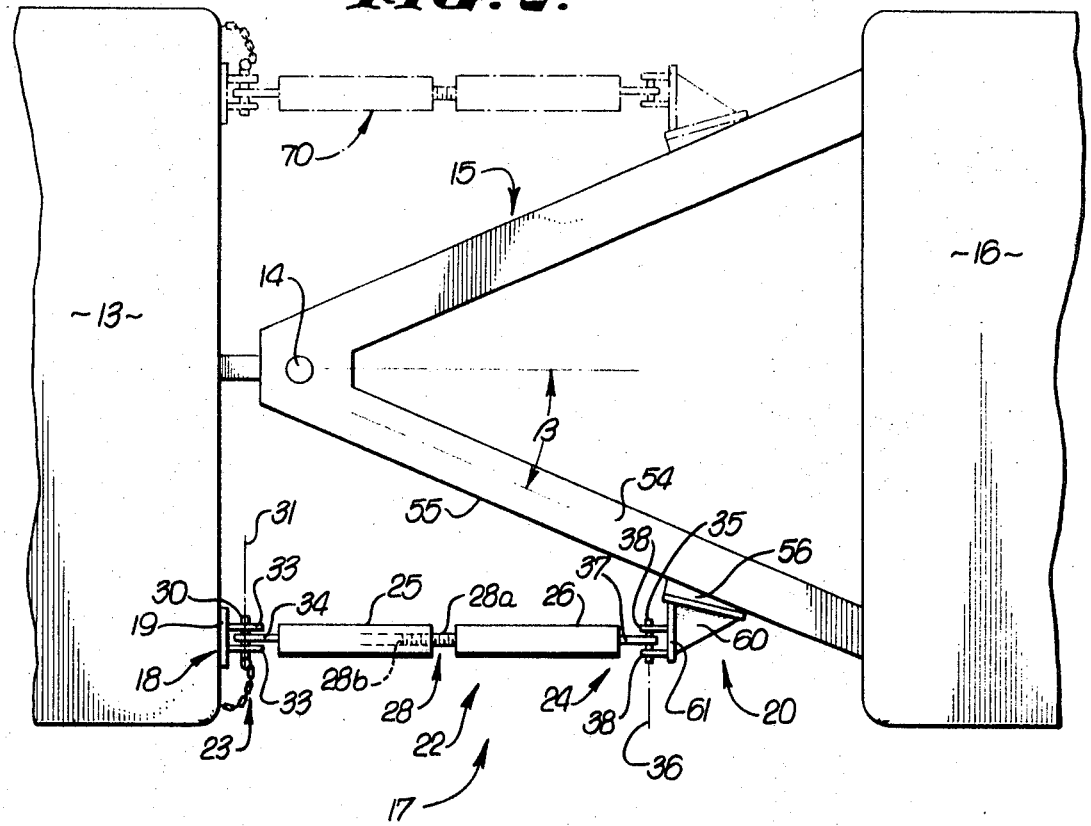
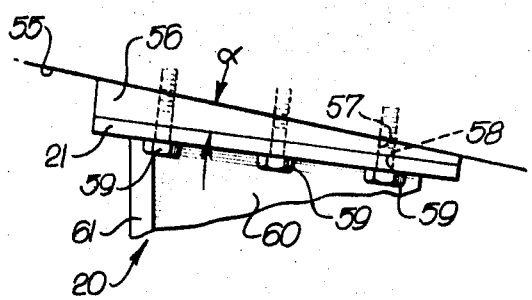
INVENTOR.
JACK B. STEWART
By
White & Haefliger
ATTORNEYS.

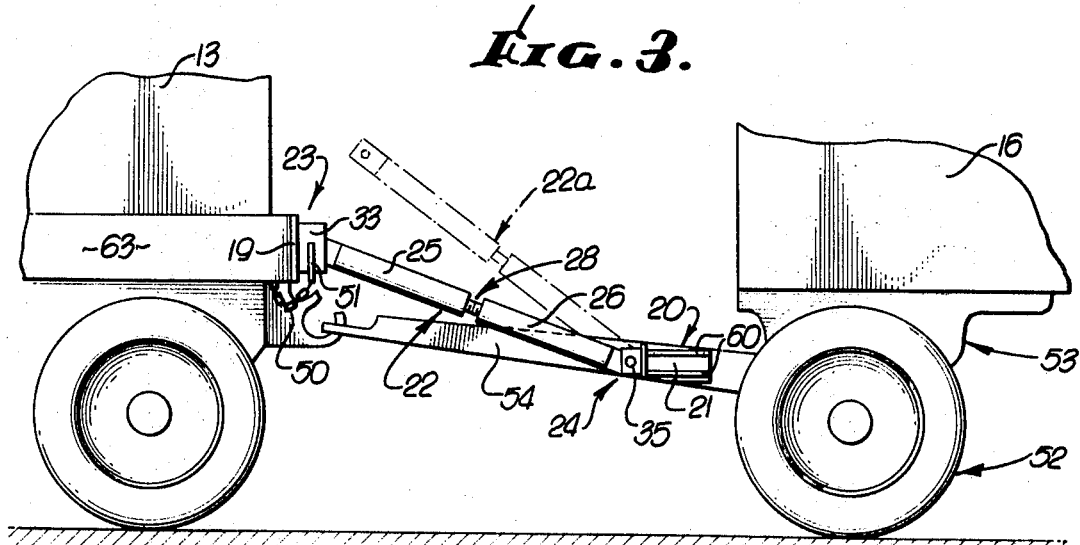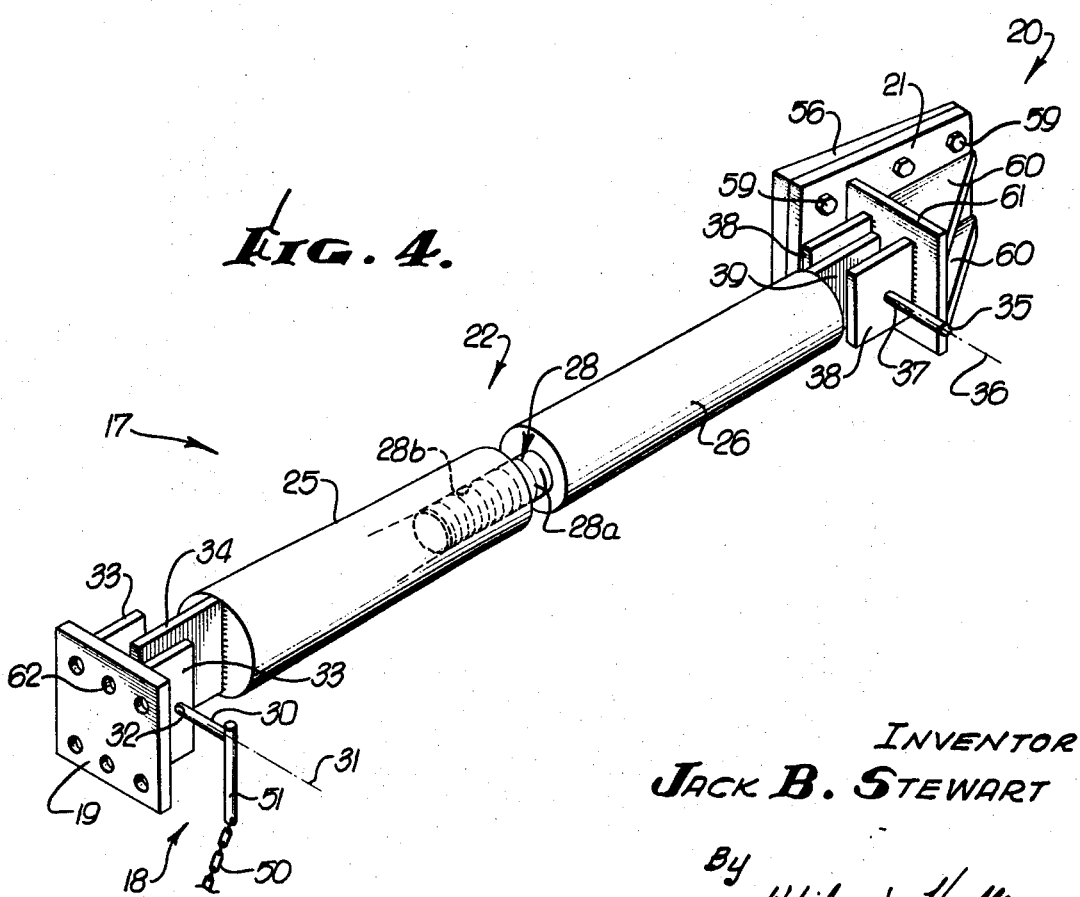

ТRAILER BACKING GUIDE

BACKGROUND OF THE INVENTION

This invention relates generally to the guiding of wheel supported trailers, and more particularly concerns the guiding of trailers during backing of same.

When loads are to be delivered by front and rear trailers (known as a set of doubles) pulled by a tractor, it is often desirable to manipulate the train to back the rear trailer against a dock. In accomplishing this, it is found to be extremely difficult for the d river to mentally deduce the precise extent of turning of the front wheels of the tractor during backing so as to produce proper relative jackknifing of the front and rear trailers for locating the rear trailer in the desired position. Accordingly, much wasted time, and corresponding expense is consumed by the driver in disconnecting the two trailers from each other and the tractor from the first trailer, connecting the tractor to the rear trailer, backing the rear trailer into desired position, disconnecting the tractor from the rear trailer, and reconnecting the tractor, first trailer and second trailer in that sequence for subsequent travel. These operations additionally require disconnection and reconnection of compressed air and electrical lines. While various trailer guides have been proposed in the past, none of such, to my knowledge, have embodied the unusually advantageous structural features, modes of operation and results characterized by the present invention and its use in solving the above problem.

SUMMARY OF THE INVENTION

It is a major object of the invention to provide trailer backing guide means easily positionable and adjustable by the operator to solve the problem described above, enabling the operator to back the train to desirably locate the rear trailer, all without disconnecting and reconnecting tractor and trailers as described.

Basically, the invention is embodied in the combination that includes:
 a. a first bracket having a base to transmit loading to or from a dolly tongue (or similar trailer pulling structure),
 b. a second bracket having a base to transmit loading to or from a vehicular pulling unit (as for example a trailer), and
 c. longitudinally elongated guide bar structure having releasable opposite end connection with the first and second brackets, the bar structure having interconnected sections which are lengthwise adjustable to lengthen or shorten the overall length of the guide bar structure to accommodate makeup of at least one end connection to its corresponding bracket.

As will be seen, the above combination may be incorporated in a train that includes a tractor, the first trailer, and a second trailer with the pulling structure for the second trailer comprising a dolly to which the first bracket is attached. Typically, the bar structure may include an adjustable threaded connection between the sections and characterized in that one section is rotatable relative to the other to provide the lengthwise adjustment.

Additional objects and advantages include the provision of end connection pivots having axes generally transverse to the direction of trailer advancement, and the provision of at least one, and preferably both, of the end connections with transversely overlapping parts one of which is integral with the bar structure and the other of which is integral with a bracket, the parts defining registered openings to releasably receive a pivot pin. Accordingly, to effect the lengthwise adjustment to permit bar installation, the bar may pivoted about the axis of one installed pivot pin sufficiently to permit section relative rotation, after which the bar may be rotated about that axis into position for attempted connection of the other pivot pin, whereby the installation of the bar may be quickly effected on a trial and error basis. Also, a tapered shim may be connected to the base of the first bracket to adapt connection of the latter to the side of a dolly arm, there being two such arms which converge, forwardly.

These and other objects and advantages of the connection, as well as the details of an illustrative embodiment, will be more fully understood from the following description and drawings, in which

DRAWING DESCRIPTION

FIG. 1 is a plan view of a tractor backing a set of doubles;
FIG. 2 is an enlarged plan view showing the guide bar interconnection of the first and second trailers of FIG. 1;
FIG. 3 is a fragmentary side elevation showing the guide bar interconnection of the first and second trailers;
FIG. 4 is an enlarged perspective showing of the guide bar structure; and
FIG. 5 is a side elevation showing shim and rear bracket interconnection;

PREFERRED EMBODIMENT DESCRIPTION

In FIG. 1, a wheeled tractor unit 10 is shown pivot connected at 11 to a first trailer 13. The latter has pivot connection at 14 to a dolly 15 supporting and connected to a rear trailer 16. In this regard, the pivot at 11 permits relative turning or jackknifing of the tractor 10 and trailer 13 about a vertical axis through the pivot; however, relative turning of the two trailers 13 and 16 about a vertical axis through pivot 14 is prevented by the backing guide generally indicated at 17. As a result, the driver may, with relative ease, back the two trailers (set of doubles) as a unit.

In FIGS. 2–4 the particular guide 17 illustrated comprises a first bracket 18 having a base 19 to transmit loading to or from trailer pulling structure (as for example the front trailer 13); a second bracket 20 having a base 21 to transmit loading to or from a vehicular pulling unit (as for example the dolly 15); and longitudinally elongated guide bar structure 22 having releasable opposite end connections at 23 and 24 with the first and second brackets, the bar structure having interconnected sections (as for example at 25 and 26) which are lengthwise adjustable to lengthen or shorten the overall length of the structure 22 thereby to accommodate makeup of at least one of the end connections to its corresponding bracket.

More specifically, the bar structure 22 may, with particular advantage, include an adjustable threaded connection at 28 between the cylindrical pipe sections 25 and 26. Connection 28 is characterized in that, when at least one of the end connections 23 and 24 is released, the sections 25 and 26 may be relatively rotated to provide the desired lengthwise adjustment, in order to enable quick initial connection of the structure 22 to both brackets respectively attached to the trailer 13 and to the dolly 15. In this regard, the thread connection 28 may include an externally threaded pin member 28a carried by section 26, and an internally threaded box member 28b carried by the section 25, or these may be reversed.

The end connections 23 and 24 may each include a pivot with an axis generally transverse to the direction of trailer advancement. For example, the pivot at connection 23 may be defined by a pin 30 having a transverse axis 31 when inserted through openings 32 in flanges 33 integral with base 19, and an aligned or registered opening in the terminal tongue 34 integral with section 25 and inserted vertically into position between flanges 33. Similarly, the pivot at connection 24 may be defined by a pin 35 having a transverse axis 36 when inserted through openings 37 in flanges 38 integral with base 21, and an aligned opening in the terminal tongue 39 integral with section 26 and inserted vertically into position between flanges 38.

Note that such construction enables quick pivot connection of the bar to bracket 20, pivoting of the bar to carry the tongue 34 into approximately the position as seen in FIG. 2 to test for registration of the openings in the overlapping tongue and flanges 33, pivoting of the bar to broken line position 22a seen in FIG. 3 to allow relative rotation of sections 25 and 26 to adjust the bar length so as to enable make up of the connection, and return pivoting of the bar to full line position seen in FIG. 3 to accomplish the connection by pin insertion. If desired, the connection 23 may first be made up, and the connection at 24 made by adjustment as described. In either event, the structure and functions are such as to enable rapid attachment and detachment of the guide bar structure, as desired, with saving of great expense to the trucker. The bar itself may be easily carried in the driver's cab in the tractor.

FIG. 4 also shows the use of a chain 50 and handle 51 connected to pin 30, attaching the latter to the trailer 13. A similar pin holder may be provided for pin 35 to retain it to the dolly 15. Dolly 15 is seen to include wheels 52, a trailer support carriage 53 carried by the wheels, and forwardly extending arms 54.

Provision may be made for attachment of the bracket base 21 to the side 55 of the dolly arm 24 as shown as through a wedge-shaped shim 56 better seen in FIGS. 2 and 5. Thus, shims of various wedge angles $\alpha$ may be provided to adapt the base 21 to dolly arms of various forward convergence angles $\beta$. The wedge has openings 57 in registration with corresponding openings 58 in the base 21 for reception of fasteners 59 connecting to the dolly arm.

Bracket 20 also includes plates 60 and 61 integral with base 21 and with the flanges 38. Base 19 of bracket 18 contains openings 62 for fasteners connecting same to the rear frame 63 of trailer 13.

If desired the trucker may install another bar structure at the opposite side of the dolly to provide additional strength for guiding. Such a second bar is indicated at 70 in FIG. 2.

I claim:

1. A wheeled trailer backing guide, comprising in combination
   a. a first bracket having a base to transmit loading to or from trailer pulling structure,
   b. a second bracket having a base to transmit loading to or from a vehicular pulling unit, and
   c. longitudinally elongated guide bar structure having releasable opposite end connections with the first and second brackets, the bar structure having interconnected sections which are lengthwise adjustable to lengthen or shorten the overall length of the guide bar structure thereby to accommodate makeup of at least one of said end connections to its corresponding bracket, said connections defined by vertical plates integral with said sections and brackets and pivots interconnecting said section and bracket plates and having generally horizontal axes whereby the guide bar structure may pivot up and down relative to the brackets during trailer advancement by said pulling unit.

2. The combination of claim 1 including said vehicular pulling unit in the form of a first trailer, a second trailer, and said trailer pulling unit in the form of a dolly attached to the rear of the first trailer and supporting the front of the second trailer.

3. The combination of claim 2 including a tractor connected in pulling relation with said trailers, the first trailer interposed between the tractor and said guide bar structure.

4. The combination of claim 1 wherein said bar structure includes only a single adjustable threaded connection between said sections and characterized in that one section is rotatable relative to the other section to provide said lengthwise adjustment.

5. The combination of claim 1 wherein said end connections include pivots with axes generally transverse to the direction of trailer advancement.

6. The combination of claim 1 wherein the plates of each connection define registered horizontally spaced openings, and each of said pivots being defined by a pin releasably received in said openings, the pin having an axis extending generally horizontally and normal to the direction of trailer advancement.

7. A wheeled trailer backing guide, comprising in combination
   a. a first bracket having a base to transmit loading to or from trailer pulling structure,
   b. a second bracket having a base to transmit loading to or from a vehicular pulling unit, and
   c. longitudinally elongated guide bar structure having releasable opposite end connections with the first and second brackets, the bar structure having interconnected sections which are lengthwise adjustable to lengthen or shorten the overall length of the guide bar structure thereby to accommodate makeup of at least one of said end connections to its corresponding bracket, and
   d. a tapered shim connected to the base of the first bracket to adapt the connection thereof to the side of said trailer pulling structure in the form of forwardly converging dolly arms.

8. The combination of claim 7, including registered openings in the shim and base of the first bracket, and fasteners projecting therethrough to connect the base and shim to one dolly arm.